US009184923B2

(12) United States Patent
Schoppmeier

(10) Patent No.: US 9,184,923 B2
(45) Date of Patent: Nov. 10, 2015

(54) METHODS FOR CONTROLLING A POWER STATE OF A NETWORK ENTITY

(71) Applicant: Lantiq Deutschland GmbH, Neubiberg (DE)

(72) Inventor: Dietmar Schoppmeier, Unterhaching (DE)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 121 days.

(21) Appl. No.: 13/857,181

(22) Filed: Apr. 5, 2013

(65) Prior Publication Data
US 2013/0266024 A1    Oct. 10, 2013

(30) Foreign Application Priority Data

Apr. 5, 2012    (EP) .................................... 12002475

(51) Int. Cl.
*H04J 3/16*    (2006.01)
*H04L 12/12*    (2006.01)
*H04L 12/28*    (2006.01)

(52) U.S. Cl.
CPC ............ *H04L 12/12* (2013.01); *H04L 12/2896* (2013.01); *Y02B 60/34* (2013.01); *Y02B 60/36* (2013.01)

(58) Field of Classification Search
CPC ....................................................... H04L 5/14
See application file for complete search history.

(56) References Cited

U.S. PATENT DOCUMENTS

| 2004/0219955 | A1* | 11/2004 | daCosta | ......................... 455/574 |
| 2005/0213405 | A1* | 9/2005 | Stopler | ......................... 365/203 |
| 2009/0022213 | A1* | 1/2009 | Shi | ................. 375/219 |
| 2009/0086798 | A1* | 4/2009 | Zukunft et al. | ............... 375/222 |
| 2010/0082827 | A1 | 4/2010 | Evensen et al. | |
| 2011/0019578 | A1* | 1/2011 | Berg et al. | ..................... 370/252 |

FOREIGN PATENT DOCUMENTS

| EP | 0800298 A2 | 8/1997 |
| EP | 1505774 A2 | 9/2005 |
| WO | 99/07162 A1 | 2/1999 |
| WO | 02/33853 A1 | 4/2002 |

OTHER PUBLICATIONS

European Search Report dated Jul. 18, 2012 for European Patent No. 12002475.7-2416, p. 1-11.
Naoki Imai, et al.; "A Consolidated Power Saving Architecture Accommodating Push-type Applications for Dual-mode Devices"; 2010 IEEE, p. 757-760.
Yuvraj Agarwal, et al.; "On Demand Paging Using Bluetooth Radios on 802.11 Based Networks"; Center for Embedded Computer Systems (CECS) Technical report #03-22; Jul. 2003, p. 1-19.

* cited by examiner

*Primary Examiner* — Andrew Lai
*Assistant Examiner* — Jamaal Henson

(57) ABSTRACT

One embodiment of the present invention relates to a network system having a first device, a second device, and a third device. The first device is coupled to a far end of a first network. The second device coupled to a far end of a second network. The third device is coupled to a near end of the second network. The third device provides a state transition request via the second network to the second device and the second device causes a transition of state in the first device.

20 Claims, 5 Drawing Sheets

METHODS FOR CONTROLLING A POWER STATE OF A NETWORK ENTITY

CROSS REFERENCE TO RELATED APPLICATIONS

This application claims priority to European Patent Application Serial No. EP12002475.7 filed on Apr. 5, 2012 entitled "Methods for Controlling a Power State of a Network Entity" and is hereby incorporated in its entirety.

BACKGROUND

Broadband communication services are increasingly present in households. Such services provide high speed Internet services, high speed video services, streaming audio services, and/or telephone services. Generally speaking, digital subscriber lines (DSL) facilitates deliver of these and other services to subscribers in various households. The DSL services are typically deployed using legacy/conventional twisted pair cables that were installed over the last few decades as part of the public switched telephone network (PSTN) that were, originally, designed to carry plain old telephone services (POTS).

DSL services typically involve a central office (CO) that provides communication services with subscribers via customer premise equipment (CPE) located at individual households. The CO equipment or modem communicates with the CPE modem in order to provide the DSL services. Subscribers are then able to receive DSL services via their home based CPE modem. In many cases, these DSL services include voice-telephony services and the subscribers no longer utilize POTS.

BRIEF DESCRIPTION OF THE DRAWINGS

Embodiments according to the invention will now be described in more detail with reference to the figures.

DETAILED DESCRIPTION

Figure 1:
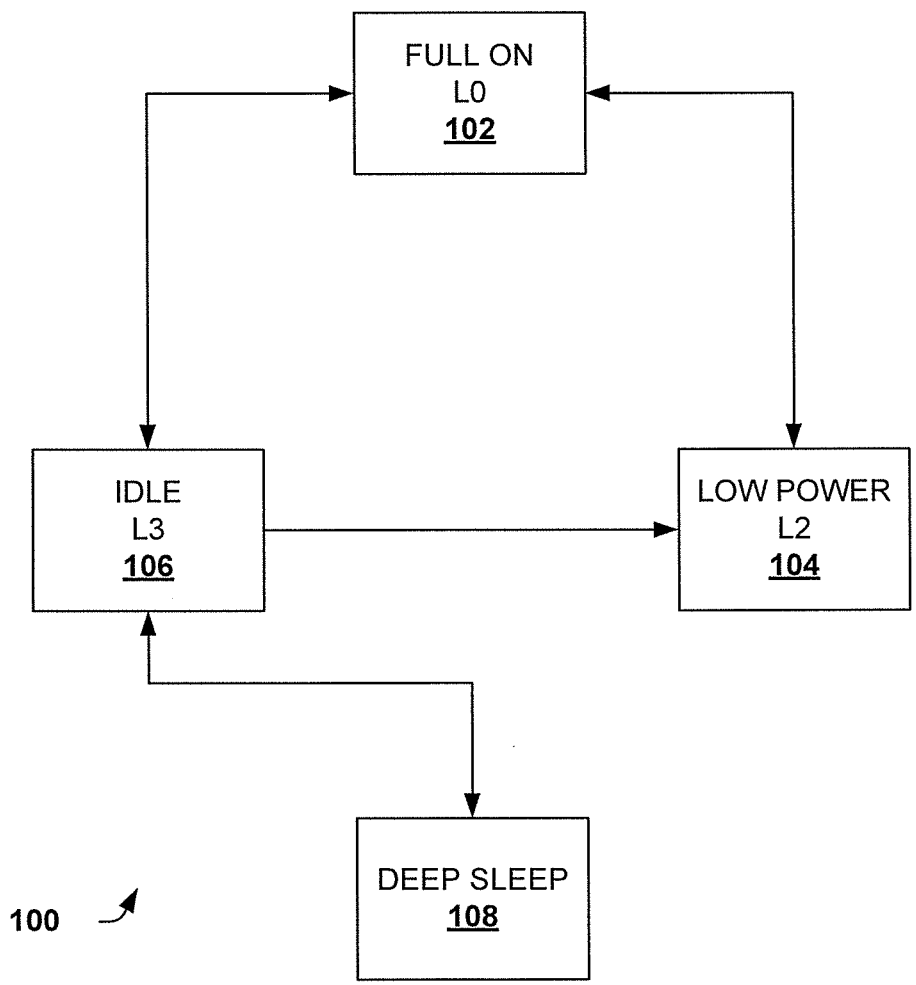
FIG. 1 is a block diagram illustrating a system utilizing a deep sleep power state in accordance with an embodiment of the invention.

FIG. 1 is a block diagram illustrating example power states, including a deep sleep state, for a system 100 in accordance with an embodiment of the invention. The system 100 is utilized with network equipment including, but not limited to DSL equipment including DSL modems used as CPE devices or modems as well as CO devices or modems, and digital subscriber line multiplexor (DSLAM) devices. It is appreciated that the present invention contemplates other network devices instead of DSL network devices. The states include an additional power state, referred to as a deep sleep state 108 to mitigate power consumption.

The system 100 includes a full on state 102, an idle state 106, a low power state 104 and the deep sleep state 108. The system 100 is described with specific states for illustrative purposes, however it is noted that alternate embodiments of the invention contemplate using additional states and varied states than those presented below.

The full on state 102 is typically referred to as state L0 for DSL, for ADSL2/2+NDSL2 modems. In this state, the modem is fully operation and is engaged and operable for transmitting and receiving at full data rates. Further, a DSL link between the modem and a far end modem is established. In this mode, high data rate operations are possible, included single and bi-directional data transfer. A full range of services are possible including, but not limited to, Internet services, high speed data services, telephone services, voice services, video services, intranet services, voice over Internet (VoIP) services, voice over DSL (VoDSL) services, and the like.

As a result, transmitting and receiving portions of the modem are active and consuming power. The state 102 results in a relatively large power consumption.

In the idle state 106, the modem is operational, but is not operable or configured for high performance. The DSL link state is idle and there is no link or signal being transmitted. The modem can transition from another state to the idle state 106 by sending a request to a far end modem, CPE or CO, to stop data transmission completely and enter this state. Then, if the far end modem acknowledges the request, the modem can enter the idle state as it requested.

The idle state 106 requires the modem to listen for handshakes from modems on the other end. This is needed because it is typically required to return to normal operations, state 102, through regular DSL initialization procedures, which start with a handshake session. The DSL initialization procedures include normal initialization and short initialization. The handshake session, in one example, is referred to as G.HS. The far end modem intending to activate or re-activate the link transmits the handshake sequence using DPSK modulation.

The transition to the idle state can occur for power saving and the like by recognizing the some or all modem services are not currently required. For example, limited or low rate data services may only be needed. In this state, all or part of the transmission path may be inactivated, however the receive path remains operational. Alternately, a delay or wait period can be initiated when a substantial pause in data or other services is needed or selected. From the idle state 106, the system 100 can transition back to the full on state 102 as needed.

In the low power state 104, a low amount of power is needed. The low power state 104 is also referred to as a L2 power state, in one example. The low power state 104 can include an active DSL link, but utilize a low power transmission state to convey only background data. The modem can transition from another state to the low power state 104 by sending a request to a far end modem, CPE or CO, to stop data transmission and enter the low power state. Once the far end modem responds acknowledging the request, the modem can enter the low power state.

In the low power state 104, the modem is still at least partially operational. A transmission path of may be partially active, but at a low power state for transmitting background data or low data rates. The low power state 104 also requires the modem to listen for handshakes from modems on the other end. This is needed because it is typically required to return to normal operations, state 102, through regular DSL initialization procedures, which start with a handshake session. The DSL initialization procedures include normal initialization and short initialization. The handshake session, in one example, is referred to as G.HS.

In the low power state 104, a receiving path may be operational, but a transmission path may be powered down in order to conserve power. However, even in the low power state 104, a significant amount of power is still consumed as at least the modem receiving path remains powered and operational, thereby consuming power. Further, some modems may not have or utilize such a low power state. The system 100 can transition from the low power state 104 to the idle state 106 or the full on state 102, as needed.

The deep sleep state 108 is the lowest power consumption state of the system 100. In the deep sleep state 108, both the receiving and transmitting paths of the modem are inactive or powered down and power consumption is at zero or near zero. An alternate network or mechanism is utilized to communicate transitions and/or requests to wake up from the deep sleep state 108, as described below.

A network system or pair of devices can be deemed to be in a deep sleep when one of a pair or more of network devices are in a power state or mode of operation that prevents the pair or more from establishing a connection or data transfer over the dedicated network without some alternate mechanism. Thus, the network system can be deemed to be in a deep sleep state where only one of a pair of modems across a dedicated network or subscriber line are in a power state wherein communications between the pair of devices are unable to be initiated or started over the dedicated network. This includes, for example, when one of a pair of devices is in a low or no power state and isn't operable to listen for tones or handshakes on the dedicated network.

For example, there are several variations or examples of the deep sleep state for a network system, when considering a near end DSL device or port and a far end DSL device or port. In a first variation, a near end DSL port is in L3 with sending G.HS tones and a far end DSL port is in L3 without listening on G.HS tones. In a second variation, a near end DSL port is in L3 without sending G.HS tones and a far end DSL port is in L3 without listening on G.HS tones. In a third variation, a near end DSL port is in L3 with sending G.HS tones and a far end DSL port is in L3 and is switched off completely. In a fourth variation, a near end DSL port is in L3 without sending G.HS tones and a far end DSL port is in L3 and is switched off completely. In a fifth variation, a near end DSL port is in L3 and is switched off completely and a far end DSL port is in L3 and is switched off completely.

Figure 2:
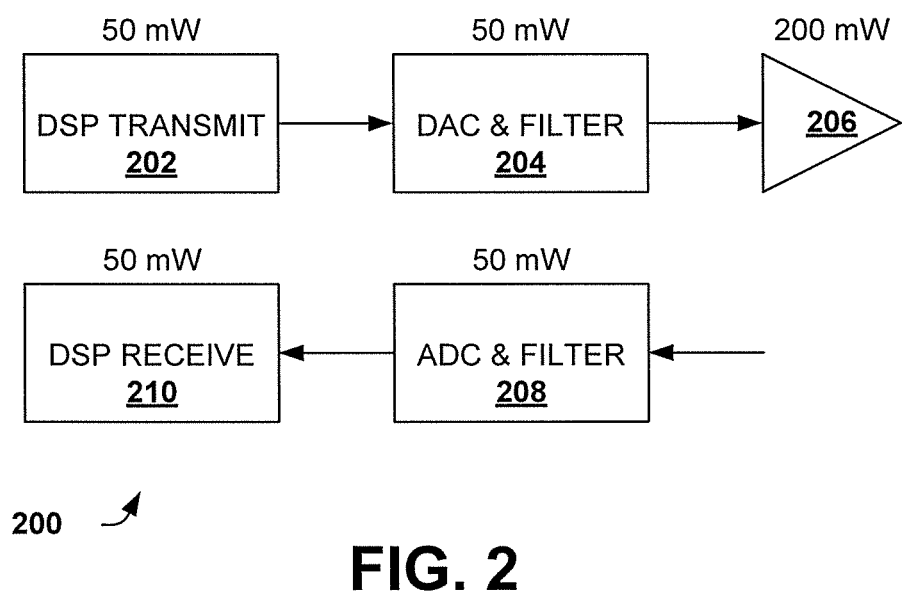
FIG. 2 is a block diagram illustrating example components for a DSL modem providing DSL services along with associated power consumption in accordance with an embodiment of the invention.

FIG. 2 is a block diagram illustrating example components for a DSL modem providing DSL services along with associated power consumption. FIG. 2 is provided as an example in order to illustrate potential power consumption savings by utilizing the present invention. However, it is appreciated that the components shown and power consumption illustrated can vary and that the invention is contemplated for varied systems and devices from those shown.

The basic system 200 is shown with a transmission path and a receiving path. The transmission path includes a digital signal processor (DSP) transmit component 202, a digital to analog converter (DAC) and filter 204, and a line driver 206. The receiving path includes an analog to digital converter (ADC) and filter 208 and a DSP receive component 210.

The DSP transmit component 202 may be configured to convert or transform data into symbols for transmission. The DAC and filter 204 may be configured to convert the symbols into modulation signals for transmission of the data. The line driver 206 may then transmit the modulation signals including the data. On the receiving side, the ADC and filter 208 receives the modulation signals and digitizes the signals.

Then, the symbols are provided to the DSP receive component 210, which transforms the symbols into received data. The DSP transmit component 202 and the DSP receive component 210 are responsible for handshakes and other signaling related to modem or DSL services.

In this example, the DSP transmit component 202 consumes about 50 mW when active. The DAC and filter 204 consumes about 50 mW when active. The line driver 206 consumes an even larger amount of power, about 600 mW when active. Thus, in the example, the transmission path consumes about 700 mW when active.

The DSP receive component 210 consumes about 50 mW when active. The ADC and filter 208 consumes about 50 mW when active. Thus, the receiving path consumes about 100 mW when active. Further, the modem 200 consumes about 800 mW when active, or in the full on (L0) state.

It is noted that DSL modems are typically operational 24 hours a day, 7 days a week. DSL modems are deemed by consumers as always on devices. Thus, power consumption over time can be relatively large. For example, the full on state can consume about 7.01 KWh of power in a year. If that number is multiplied by the number of households and/or DSL modems in operation, the power consumption number may be enormous.

In the low power state (L2), the modem 200 is partially active. The transmission path may be active, but is not used for full power transmission. In this state a lower power signal is used so the line driver uses less than the full 600 mW.

In the idle state (L3), the modem 200 is still partially active and is waiting for other or far end activation. The transmission path is inactive and uses only a minimal amount of power. However, the receiving path remains active while waiting for far end activation, via a handshake. Thus, the receiving path continues consuming about 100 mW of power, even while in the idle state.

An embodiment according to the invention includes a deep sleep state, see state 108 above, where the entire modem or network device is inactive and may utilize only a relatively amount of power when compared to other states. In an embodiment of the deep sleep state, the modem can be deemed to be disabled completely in order to facilitate power saving. Because the modem is disabled, communication to a far end network device via a dedicated network, such as a subscriber loop or link, may not be possible. However, in an embodiment according to the present invention, an alternate network can be utilized to transition the modem or device into an operational state.

The alternate network, such as a cellular network, Wifi network, cable modem network, power line network, and the like, can be utilized to send a message or request to a far end network device. The message or request can be processed at the far end to wakeup near end and far end network devices and establish a link or dedicated network connection. Thus, the near and far end network devices exit the deep sleep state and enter an operational mode, including, for example, a full on state, an idle state, a low power state, and the like.

Typically, the dedicated network has a higher bandwidth and capability than the alternate network.

Figure 3:
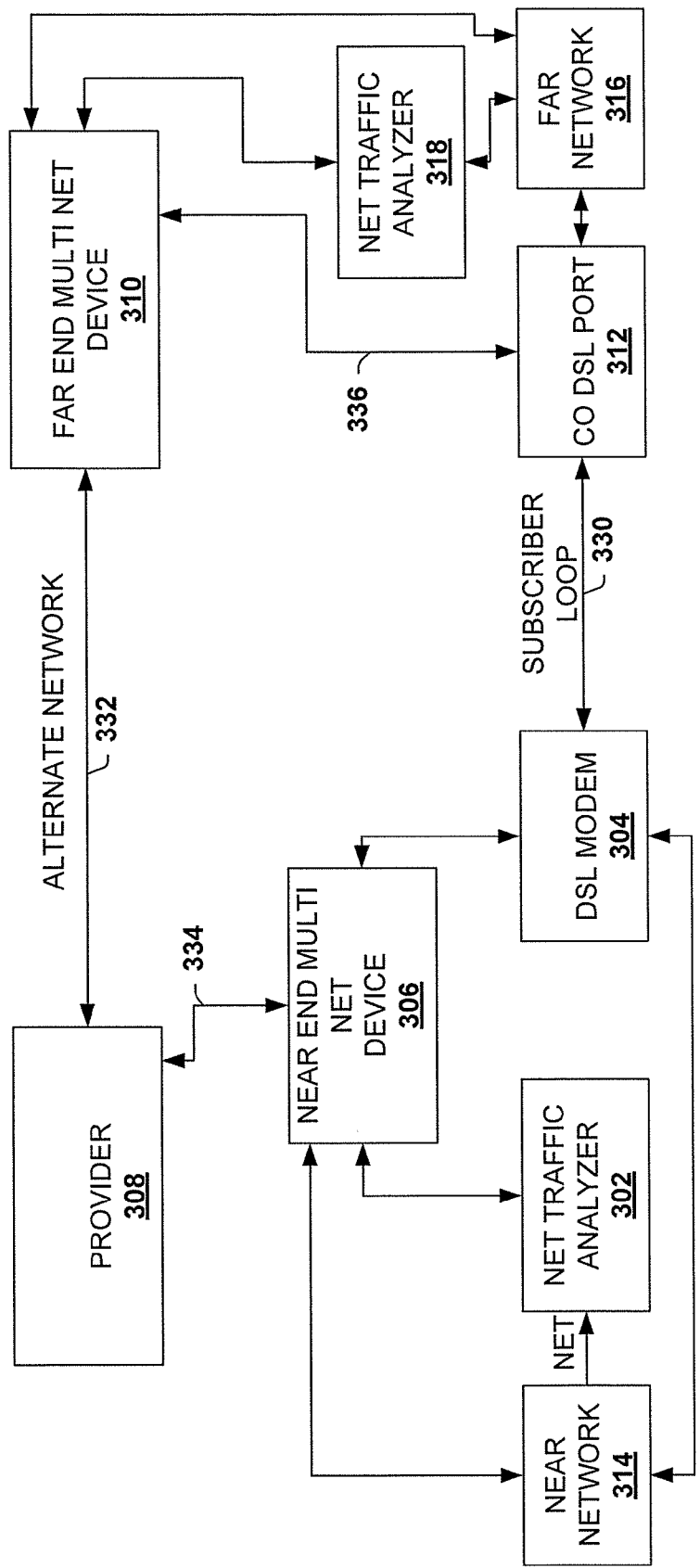
FIG. 3 is a block diagram illustrating a network system that utilizes an alternate network for controlling power states of network devices.

FIG. 3 is a block diagram illustrating a network system 300 that utilizes an alternate network for controlling power states of network devices. The system 300 mitigates power consumption by facilitating use of deep sleep states for devices and/or systems that consume little or no power.

The system 300 is described with reference to digital subscriber line (DSL) components and system in order to facilitate understanding of the invention. However, it is appreciated that embodiments of the invention contemplate using other types of networks and network devices beyond DSL components and devices.

The system 300 includes a near end network 314, a network traffic analyzer 302, a near end network device (DSL modem) 304, a near end multinet device 306, a provider 308, a far end multinet device 310, a far end network device (DSLAM) 312, a far end network 316, a dedicated network (subscriber loop) 330, a far end network traffic analyzer 318, and an alternate network 332.

A first scenario describes a wakeup request initiated by a near side or near end of the system 300. The near end network 314 may send data or information to the far end network 316 at various times. The data can be in the form of a VoIP call, incoming or outgoing, a request for a download of data, a request for a stream of data, web browsing, and the like. The system 300 is described with a near end request for the dedicated network 330 and a far end request for the dedicated network 330. The request can include a desired operating state, such as the L0, L2 and L3 states described above.

The network traffic analyzer 302 monitors the near end network 314 to identify or determine an occurrence or need to transfer data with the far end network 316. The occurrence can coincide with an event, such as voice calls, video streaming, and the like. Additionally, the network traffic analyzer can monitor the level or amount of data to be transferred. If the level is above a threshold value, a determination is made that the dedicated network 330 is needed. If the level is below or at the threshold value, the data can be queued for later transfer or, alternately, transferred via the alternate network 332. On identifying the occurrence or need for the dedicated network 330, a request is sent to the near end multinet device 306.

It is noted that the wakeup request is sent to the multinet device 306 when the network devices are unable to establish the desired operation level over the dedicated network 330. This includes scenarios where only one or the other of the network devices 304 and 312 are themselves in a deep sleep state, causing the system to be in a deep sleep state.

The near end multinet device 306 is configured to communicate with the near end network device 304 and the alternate network 332. On a wakeup request, the near end multinet device 306 sends the request to the far end multinet device 310 via the alternate network 332 by way of the provide 308. The wakeup request can include a variety of information including, but not limited to, a desired operational state for the devices 304 and 312, a time window, type of data to be transferred, amount of data to be transferred, identity of the far end multinet device 310, and the like. For example, the identity can include a phone number, email address, ip-address, web address (URL), and the like.

The provider 308 receives the request 334 and identifies the far end multinet device 310. The provider then forwards the request via the alternate network to the far end multinet device 310. The provider 308 is configured to communicate with the near end multinet device 306 and the far end multinet device 310 and to identify the far end multinet device 310 from the request or other information. The provider 308 can include, for example, a cellular network, an email server, a network server, and the like. The other information can include search algorithms and the like that identify far end devices that can comply with a particular request. Additionally, it is appreciated that the alternate network 332 can comprise one or more types of networks. Thus, the provider 308 can also select one (or more) of the types of networks to forward the request to. The alternate networks can include one or more of a cellular network, powerline network, wifi network, cable modem network, and the like.

The far end mutlinet device 310 is configured to communicate with multiple networks including the far end network device 312 and the alternate network 332. The far end multinet device 310 receives the request and may perform additional actions. The far end multinet device 310 may analyze the request in order to determine whether to comply with the request.

If the far end multinet device decides to proceed, the request is sent to the far end network device 312. Additionally, the near end multinet device 306 sends the request to the near end network device 304. As a result, both devices 304 and 312 wakeup and transition to the selected operational state. If the far end multinet device declines the request, a response or challenge can be sent back to the near end multinet device 306 via the alternate network 332.

On both devices 304 and 312 transitioning to the operational mode or state, the dedicated network 330 becomes active and available for transferring of data between the near end network 314 and the far end network 316.

It is appreciated that the network traffic analyzer 302 can also monitor network traffic and determine that one of the operational states is not needed and that the network device 304 should enter the deep sleep state in order to mitigate power consumption.

In another scenario, the system 300 has both devices 304 and 312 again in the deep sleep state. The far end network analyzer 318 monitors network traffic on the far end network 316 similar to how the network traffic analyzer 302 operates. The far end network analyzer 318 determines a need for the dedicated network 330 and provides a request to the far end multinet device 310. In one example, the analyzer 318 identifies the need by network traffic for the far end network 316 exceeding a threshold value. In another example, the analyzer 318 identifies the need by the occurrence of an event.

The wakeup request can include a variety of information including, but not limited to, a desired operational state for the devices 304 and 312, a time window, type of data to be transferred, amount of data to be transferred, identity of the near end multinet device 306, and the like. For example, the identity can include a phone number, email address, ip-address, web address (URL), and the like.

The far end multinet device 310 processes the request and forwards the request to the provider 308 via the alternate network 332. The request can be forwarded by one or more networks of the alternate network, such as a cellular network, powerline network, and the like.

The provider 308 receives the request and identifies the near end mutlinet device 306 from the request. The provider provides the request to the near end multinet device 306, which wakes of the near end device 304. The far end request is provided via the alternate network 332, which includes one or more of cellular network, powerline network, wifi network, cable modem network, and the like. The far end multinet device 310 similarly wakes up the far end network device 312.

On both devices 304 and 312 transitioning to the operational mode, the dedicated network 330 becomes active and available for transferring of data between the near end network 314 and the far end network 316. Thus, the device 304 and 312 can utilize procedures using the dedicated link to establish communications. For example, DSL modems can utilize DSL handshake procedures to establish communications and make the dedicated link fully operational.

It is appreciated that the far end network traffic analyzer 318 can also monitor network traffic of the far end network 316 and determine that one of the operational states is not needed and that the network device 304 should enter the deep sleep state in order to mitigate power consumption.

It is also appreciated that alternate embodiments of the invention can include addition components and/or exclude included components. For example, alternate embodiments could forgo the provider 308 and instead utilize direct communications between the multinet device 306 and 310.

Several example implementations will now be discussed with reference to FIG. 3. A first example is for a user at a near end to setup a phone call via his digital enhanced cordless telecommunications (DECT) phone, which is connected to a CPE device, the near end network device 304. The network traffic analyzer 314 identifies the need and sends the request to the near end multinet device 306, which in this example is a smart phone connected to a wireless network. The smart phone sends the request as an SMS message via a 3G network to a base station. The 3G network is the alternate network 332 and the base station operates as the provider 308. The base station routes the message to a responsible DSLAM, the far end multinet device 310, where a corresponding CO DSL port, the far end network device 312, will transition to an operational state.

In another example, a powerline network is used as the alternate network 332. A CPE device, the network device 304, and a CO DSL port, the network device 312, are powered down in the deep sleep state. A user wishes to setup a VoIP call via a DECT phone which is connected to the CPE device via the near side network 314. The network analyzer 302 identifies the request and sends a wakeup request to the CPE device a wakeup request to the near end multinet device 306, which in this case is a G.HN device. The G.HN device is a device that follows the G.HN specification for existing wire home networking and includes operation over three types of legacy home wires, telephone wiring, coaxial cables and power lines. The G.HN device provides the request to a smart metering device which forwards the request to an electric supply company, operating as the provider 308. The electric supply company routs the request to a DSL operator center, the far end multinet device 310 and then to the DSLAM and corresponding CO DSL port, to transition the CO DSL port, the far end network device 312, to an operational state. Thus, the CO DSL port transitions into the operational state and the dedicated network 330 can be re-established.

Figure 4:
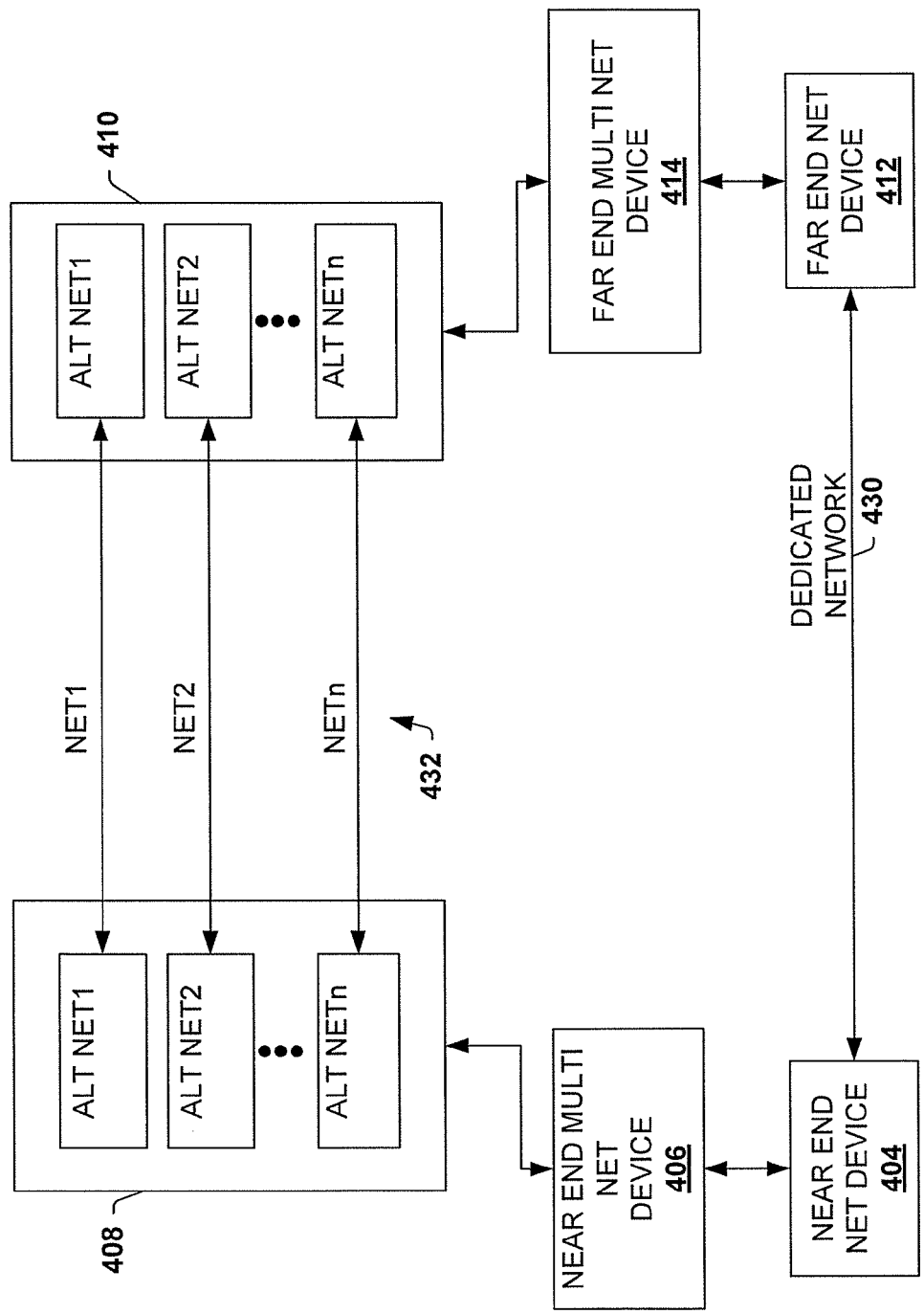
FIG. 4 is a block diagram illustrating a network system that utilizes an alternate network for controlling power states of network devices.

FIG. 4 is a block diagram illustrating a network system 400 that utilizes an alternate work for controlling power states of network devices. The system 400 mitigates power consumption by facilitating use of deep sleep states that consume littler or no power. The deep sleep states further characterized by lacking the ability to establish communication between the network devices from the deep sleep states. It is appreciated that the system 400 can be incorporated into the system 300.

The system 400 includes a near end network device 404, a near end multinet device 406, a near end alternate network link 408, a far end alternate network link 410, a far end network device 412, and a far end multinet device 414. The near end alternate network link 408 is coupled to the far end alternate network link 410 by one or more alternate networks 432. The near end network device 404 is coupled to the far end network device 412 by a dedicated network 430, such as a DSL based subscriber loop.

The near end multinet device 404 is configured to communicate with the far end multinet device 414 by way of the near end link 408, the alternate networks 432, and the far end link 410. The near end multinet device 406 is a device capable of communicating with multiple networks and/or network devices. The device 406 can be encompassed in another device, such as the near end network device 404, or be a separate or discreet component.

The near end network device 404 can be a DSL modem or other type of network device. The near end network device 404 is also configured to connect to a near end network (not shown). The near end network can include local networks, local wired networks, Wifi networks, and the like. Other local devices (not shown), such as printers, computers, phones, and the like can be connected to the near end network device 404 via the near end network.

The near end multinet device 406 is configured to connect to the near end network and the one or more alternate networks 432 via the near end network link 408. Thus, the near end multinet device 406 is able to transfer data and messages between the near end network and the alternate networks 432. The near end network link 408 can be part of or separate from the near end multinet device 406. The near end network link 408 is operable to establish or maintain the various networks of the one or more alternate networks 432.

As stated above, the far end network device 412 is connectable to the near end network device 404 by a dedicated network 430. The far end network device 412 can be a DSL related device, such as a CO port. The far end network device 412 is connected to a far end network (not shown). A variety of devices can be connected to the far end network including, but not limited to, computers, VoIP phones, media devices, and the like.

The far end multinet device 414 is also connected to the far end network. Additionally, the far end multinet device 414 is connected to the alternate networks 432 via the far end network link 410. The far end multinet device 414 is a device capable of communicating via a plurality of networks including the far end network and the alternate networks 432. In one example, the multinet device 414 is a cell phone. In another example, the multinet device 414 is a powerline network device.

The alternate networks 432 comprise one or more individual alternate networks. The networks 432 and associated devices that can be employed with system 400 include, but are not limited to xDSL wireline network with CO device and CPE device, WiFi/WLAN wireless network with transceivers 11.b/g/n, 2G/3G/4G mobile networks with cell phone transceivers and base stations, power wireline networks with transceivers (Homeplug AV, G.HN, or G.NNEM), coax cable or phone cable wireline network with transceivers (G.HN), and the like.

It is noted that wakeup requests and acknowledgements can be conveyed by more than one network of the alternate networks. For example, a request can be conveyed on multiple networks at the same time to increase the likelihood that the request is received at the other end. Further, it is appreciated that acknowledgements can be sent on a network varied from the request.

Figure 5:
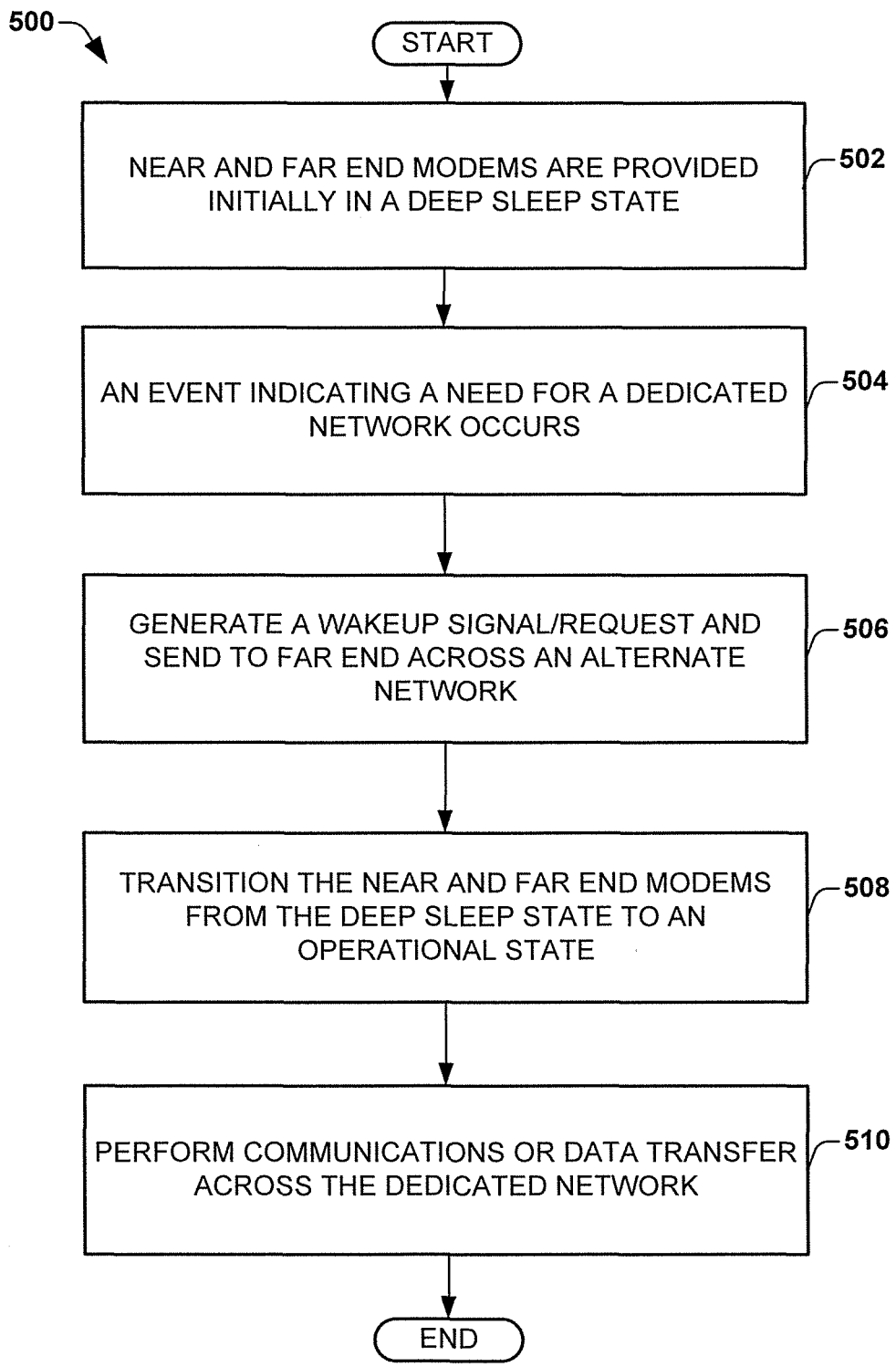
FIG. 5 is a flow diagram illustrating a method of controlling power states of network devices.

FIG. 5 is a flow diagram illustrating a method 500 of controlling power states of network devices. The method 500 permits transitioning network devices from a deep sleep to an operational state when they are unable to communicate on their own.

When the network devices are in a deep sleep state, they are unable to initiate procedures to establish communications, such as handshake procedures, because their transmitting and receiving paths are powered down. Thus, they are unable to communicate or signal other network devices over a dedicated network, such as a DSL subscriber loop. Instead, an alternate network is utilized to signal other network devices to wakeup and establish communication or data transfer over the dedicated network. In response to the signals, also referred to as a wakeup request, the network devices are woken up and enter an operational state.

The method 500 is described with respect to a near end and a far end, which represent opposite sides or ends of communications between network devices. In order to facilitate an understanding of the method 500, it is appreciated that the network devices are initially in a deep sleep state wherein operation communications between the network devices are not possible over a dedicated network.

The method 500 begins at block 502, where a near end modem and a far end modem are provided. The near end modem and the far end modem are initially in a deep sleep state. Because of this, the near end modem and the far end modem are unable to initiate communications over a dedicated network and/or transition from the deep sleep state by using typical procedures.

An event indicating a need for communication via the dedicated network occurs at block 504. The dedicated network is the network between the near end modem and the far end modem. The dedicated network is typically a high speed network. Examples of the event include, but are not limited to, an outgoing phone call, an incoming phone call, streaming a movie, transferring data, network traffic exceeding a threshold value and the like. The event is related to activity on a near end network, such as a local area network (LAN) and the like. One or more devices can be coupled to the near end network such as, computers, phones, and the like. The one or more devices can be the source of the event.

A wakeup request is generated and sent from a near end to a far end across an alternate network at block 506. The near end includes the near end network device and other near end devices coupled to the near end network. The far end includes a far end network and far end devices coupled to the far end network. A near end multinet device sends the wakeup request across the alternate network. The near end multinet device is coupled to the near end network, the alternate network, and the near end network device. The near end multinet device also signals the wakeup request to the near end network device. At the far end, a far end multinet device receives and relays the wakeup request to the far end network device. The far end multinet device is coupled to the far end network, the alternate network, and the far end network device.

In another example, a provider is utilized to select or identify the far end and the far end multinet device and to relay the wakeup request to the far end. In one example, the provider is a cellular network that identifies the far end from an SMS message. In another example, the provider is a powerline controller. Other suitable providers can be utilized.

The near end network device and the far end network device transition from the deep sleep state to an operational state in response to the wakeup request at block 508. The near end network device receives the wakeup request from the near end multinet device and the far end network device receives the wakeup request from the far end multinet device. The operational state is a state wherein at least a portion of transmitting or receiving paths for the near and far end network devices are at least partially operational so that communication establishing procedures, such as DSL handshake procedures, can be initiated over the dedicated network. Some examples of suitable operational states include an idle state, a full on state, a low power state, and the like.

Once the network devices have entered the operational state, communications and/or data transfer can be performed across the dedicated network at block 510. Thus, a near end device can communicate with a far end device using the dedicated network via the near end network device. In one example, a phone call is placed from a phone coupled to the near end network to a second phone coupled to the far end network after communications have been established.

Understanding of the method 500 can be enhanced by utilizing the above systems and devices. However, the method 500 and variations thereof can be implemented using devices and systems varied from the above.

While the above method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

The independent claims define the invention in various aspects. The dependent claims define embodiments according to the invention in the various aspects.

The present invention applies to digital subscriber line (DSL) access networks and other networks providing various services including voice telephone over DSL (VoIP), data transfer, video streaming, and the like. The invention utilizes alternate networks, such as cellular networks, powerline networks, coax cable networks, and the like to wakeup and re-establish a primary link or dedicated network for providing network services.

The present invention includes systems and methods that mitigate power consumption by providing a deep sleep state, wherein a network device, such as a DSL modem, is at or near a zero power consumption state. A dedicated network may not be available for communication so an alternate network is utilized to signal or request a far end to transition to an operational state.

In a first aspect, a method of controlling power states in a network system is disclosed. The system is configured for a dedicated network and an alternate network. A state transition request is sent from a near end network device across the alternate network. The state transition request is received at or by a far end network device of the alternate network. The far end network device transitions to a first state in response to the state transition request. A communication session is established between the fare end network device and the near end network device over the dedicated network.

In another aspect, the disclosure encompasses a method of controlling power states in a network system. The network system has an alternate network. The network system is configured to establish a dedicated network. The dedicated network may be dedicated to providing a communication channel for a communication session between a near end network device coupled to the dedicated network and a far end network device also coupled to the dedicated network. The method comprises receiving a state transition request at a far end of the alternate network. Upon receiving the state transition request at the far end of the alternate network, the method comprises transitioning the far end network device to a first state in response to the state transition request. In an embodiment the transitioning is performed right upon the receiving. Further, the method may comprise transitioning the near end network device to the first state in response to the state transition request. In an embodiment the method comprises sending the state transition request from a near end across the alternate network to the far end, in particular to the far end network device. The method may further comprise generating the state transition request, for example, at the near end, in particular in a local device at the near end. At least one effect may be that the far end network device may be put into a deep sleep mode wherein the far end network device consumes very little power. In this deep sleep mode, the far end network device may not be able to receive signaling via the dedicated network. However, using a second device at the far end of the alternate network, wherein this second device is both, receptive to signaling provided via the alternate network and coupled to the far end network device at the far end of the dedicated network, transition signaling can still be provided to the far end network device at the far end of the dedicated network via the coupling to the second device at the far end of the alternate network so as to wake up the far end network device at the far end of the dedicated network into the first state, for example bring it into a wakeup state.

An embodiment according to the invention in the first aspect further comprises establishing a communication session between the far end network device and the near end network device upon transitioning the far end network device and the near end network device to the first state. In an embodiment according to the invention in the first aspect the establishing the communication session comprises establishing a dedicated network between the far end network device and the near end network device.

One embodiment of the invention relates to a method for controlling power states of network devices. A state transition request is generated and sent from a near end to a far end of a network system across an alternate network. The state transition request is received at a far end of the alternate network. A far end network device is transitioned to a first state in response to the state transition request. A near end network device is transitioned to the first state in response to the state transition request. In an embodiment a dedicated network or communications is established between the first network device and the second network device on transitioning the far end network device and the near end network device to the first state.

In a second aspect the invention encompasses a remote device for use in a network system. The remote device is configured for coupling to a far end network device that is coupled to a far end of a first network. The remote device is further configured for coupling to a far end of a second network wherein the remote device is adapted to receive a state transition request via the second network. In an embodiment the request is issued from a local device coupled to a near end of the second network. The remote device, in receipt of said state transition request, is further adapted to cause a transition of state in the far end network device. In an embodiment according to the invention in the second aspect the remote device is at least one of a group comprising a cell phone and a metering device. At least one effect may be that the far end network device may be made to transit from a deep sleep mode or state in which the far end device may not be receptive to signaling provided via the first network into another mode for communication via the first network into another mode or first state where the far end device is receptive to signaling via the first network. In the deep sleep mode power savings may be particularly large in comparison with the another mode.

In a third aspect the invention encompasses a network system.

One embodiment of the present invention relates to a network system having a first device, a second device, and a near end device. The first device is coupled to a far end of a first network. The second device coupled to a far end of a second network. The near end device is coupled to a near end of the second network. The near end device provides a state transition request via the second network to the second device and the second device causes a transition of state in the first device.

Another embodiment of the present invention relates to a network system having a multinet device and a first end network device. The multinet device is coupled to an alternate network and a first end network. The first end network device is coupled to the first end network and a dedicated network. The multinet device provides a wakeup request to the first end network device and the alternate network, wherein the wakeup request includes a transition from a deep sleep state to an operational state.

In alternate embodiments, the alternate network includes one of a cellular network, a power line network, and a Wifi network. In other embodiments of the above, the dedicated network is a DSL network or a cable network. In other embodiments, the first end network device is a cable modem. In still other embodiments, the multinet device is a cell phone. In other embodiments, the second end network device and the first end network device establish a communication link on the dedicated network in response to the request.

Another embodiment of the present invention relates to a network system having a first end multinet device, a first end network device, a second end multinet device, and a second end network device. The first end multinet device is coupled to an alternate network and a first end network. The second end multinet device is coupled to the alternate network and a second end network. The first end network device is coupled to the first end multinet device, the first end network and a dedicated network. The second end network device is coupled to the second end multinet device, the second end network and the dedicated network. The first end network device and the second end network device are operating in a deep sleep state, wherein little power may be used and the first end network device and the second end network device may be unable to establish communications via the dedicated network.

In other embodiments of the above, one or more first end devices are coupled to the first end network. The first end devices include, for example, phones, computers, mobile devices, powerline devices and the like. In other embodiments of the above, one or more second end devices are coupled to the second end network. The second end devices include, for example, phones, computers, mobile devices, powerline devices and the like.

In one embodiment the network system comprises a first device coupled to a far end of a first network and a second device coupled to a far end of a second network and coupled to the first device. The network system may further comprise a third device coupled to a near end of the second network. In an embodiment the third device is adapted to provide a state transition request via the second network to the second device. In an embodiment according to the invention in the third aspect the third device is a cable modem. The second device is adapted to cause a transition of state in the first device, when in receipt of said state transition request. At least one effect may be that the first device at the far end of the first network may be made to transit from a deep sleep mode in which the first device may not be receptive to signaling provided via the first network into another mode for communication via the first network. In the deep sleep mode power savings may be particularly large in comparison with the another mode.

In an embodiment according to the invention in the third aspect the first network includes at least one network selected from the group comprising a DSL network and a cable network. In an embodiment according to the invention in the third aspect the second network includes at least one network selected from the group comprising a cellular network, a powerline network, and a WiFi network.

An embodiment according to the invention in the third aspect further comprises a provider configured to relay the state transition request across the second network. In an embodiment according to the invention in the third aspect the provider is configured to identify the second device from the state transition request. In an embodiment according to the invention in the third aspect the provider is configured to relay the request to the first device.

An embodiment according to the invention in the third aspect further comprises a fourth device coupled to the first network, wherein the third device causes a transition of state in the fourth device. In an embodiment according to the invention in the third aspect the first device and the fourth device are adapted to establish a communication link on the first network. At least one effect may be that the transition request propagates via the second network to the second device and on to the first device where a first device state transition is initiated. Meanwhile the fourth device, where a fourth device state transition is initiated, is to commence a communication session between the first device and the fourth device, in particular, using the first network.

In an embodiment according to the invention in the third aspect the system is configured to perform the method of controlling power states in a network system according to the invention in the first aspect. In an embodiment according to the invention in the third aspect the first device is provided as the far end network device coupled to the far end of the dedicated network. In an embodiment according to the invention in the third aspect the second device is provided as the remote device according to the invention in the second aspect. In an embodiment according to the invention in the third aspect the fourth network device is provided as the near end network device. In an embodiment according to the invention in the third aspect the first state is an operational mode other than the deep sleep state wherein the device is not receptive to transition signaling and/or other signaling provided at the far end coupling to the first network.

An embodiment according to the invention in the third aspect further comprises a first end local device coupled to the first end network device and a second end local device coupled to the local device, wherein the first end local device requests communication with the second end local device. In an embodiment according to the invention in the third aspect the fourth device is provided as the first end local device. In an embodiment the third device is provided as the second end local device.

In an embodiment according to the invention in the third aspect the first end local device provides a transition request to the second end local device.

In an embodiment according to the invention in the third aspect the first device and the second device are configured to transition from the deep sleep state to an operational state in order to provide the communication between the first end local device and the second end local device.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method of controlling power states in a network system, the system being configured for a dedicated network and an alternate network, the method comprising:
sending a state transition request from a near end network device across the alternate network;
receiving the state transition request at a far end network device of the alternate network;
in response to the state transition request, the far end network device causing a transition of a further far end network device to a first state; and
establishing a communication session between the further far end network device and the near end network over the dedicated network.

2. The method of claim 1, further comprising
transitioning a further near end network device to the first state in response to the state transition.

3. The method of claim 2, wherein establishing the communication session occurs on both the further near end network device and the further far end network device transitioning to the first state.

4. The method of claim 1, wherein the first state is a full ON state.

5. The method of claim 1, further comprising sending a second state transition request from the far end network device across a second alternate network, wherein the second alternate network is varied from the alternate network and the dedicated network.

6. The method of claim 5, further comprising receiving the second state transition request by the near end network device and the near end network device causing transition of a further near end network device from the first state to a second state.

7. A network system comprising:
a far end network device located at a far end of a first network;
a remote device configured for coupling to the far end network device using the first network;
a further far end network device located at a far end of a second network and coupled to the far end network device; and
wherein the remote device is further configured for coupling to the further far end network device using the second network in response to a state transition request received via the first network from the far end network device.

8. The system of claim 7, wherein the remote device is at least one of a group comprising a cell phone, a WiFi device and a metering device.

9. The system of claim 7, wherein the second network is a DSL based subscriber loop.

10. The system of claim 7, wherein the first network includes a plurality of alternate networks.

11. The system of claim 10, wherein the plurality of alternate networks includes one or more networks from the group comprising powerline networks and mobile networks.

12. A network system comprising:
a first device coupled to a far end of a first network;
a second device coupled to a far end of a second network and to the first device;
a third device coupled to a near end of the second network; and wherein the third device is adapted to provide a state transition request via the second network to the second device, and wherein the second device in receipt of said state transition request is adapted to cause a transition of state in the first device.

13. The network system of claim 12, wherein the second network includes at least one network selected from the group comprising a cellular network, a powerline network, and a WiFi network.

14. The network system of claim 12, wherein the first network includes at least one network selected from the group comprising a DSL network and a cable network.

15. The network system of claim 12, wherein the third device is a cable modem.

16. The network system of claim 12, further comprising a provider configured to relay the state transition request across the second network.

17. The network system of claim 16, wherein the provider is configured to identify the second device from the state transition request.

18. The network system of claim 17, wherein the provider is configured to relay the request to the first device.

19. The network system of claim 18, further comprising a fourth device coupled to the first network, wherein the third device causes a transition of state in the fourth device.

20. The network system of claim 19, wherein the first device and the fourth device establish a communication link on the first network.

* * * * *